United States Patent
Chang et al.

(10) Patent No.: US 7,840,819 B2
(45) Date of Patent: Nov. 23, 2010

(54) AUTOMATIC SWITCH METHOD AND APPARATUS FOR A USB

(75) Inventors: Wei-Teng Chang, Taipei (TW); Wei-Che Chiu, Gukeng Township, Yunlin County (TW); Li-Wei Lee, Shindian (TW)

(73) Assignee: Richtek Technology Corp., Hsinchu (TW)

( * ) Notice: Subject to any disclaimer, the term of this patent is extended or adjusted under 35 U.S.C. 154(b) by 1067 days.

(21) Appl. No.: 11/401,254

(22) Filed: Apr. 11, 2006

(65) Prior Publication Data

US 2006/0236141 A1    Oct. 19, 2006

(30) Foreign Application Priority Data

Apr. 14, 2005   (TW) .............................. 94111868 A

(51) Int. Cl.
    *G06F 1/00*    (2006.01)

(52) U.S. Cl. ..................................................... 713/300
(58) Field of Classification Search ................. 713/300, 713/340
    See application file for complete search history.

(56) References Cited

U.S. PATENT DOCUMENTS

2003/0095368 A1*  5/2003  Daniels et al. ............. 361/93.9

* cited by examiner

*Primary Examiner*—Thomas Lee
*Assistant Examiner*—Mohammed H Rehman
(74) *Attorney, Agent, or Firm*—Rosenberg, Klein & Lee

(57) ABSTRACT

An automatic switch method and apparatus are used to set the output current of a USB by slowly increasing the output current under monitoring the voltage on the USB. If the USB could normally operate until the output current reaches a threshold value, a higher level is set for the output current, otherwise a lower level is set instead. The process may be performed periodically to dynamically determine the output current for the USB.

4 Claims, 5 Drawing Sheets

US 7,840,819 B2

AUTOMATIC SWITCH METHOD AND APPARATUS FOR A USB

FIELD OF THE INVENTION

The present invention is related generally to a universal serial bus (USB) and, more particularly, to an automatic switch method and apparatus for a USB.

BACKGROUND OF THE INVENTION

Currently, there are two types of USB ports, 100 mA type and 500 mA type. When using USB port for a battery charger, if the USB port is a 100 mA type but 500 mA is sinking to a charged battery, the voltage on the USB port would be loading to fail. Contrarily, if the USB port is a 500 mA type but only 100 mA is sinking to the charged battery, the charge time will be long and the charge efficiency is low. However, it is difficult for the end users and system designers to know or predict which USB type will be used.

On the other hand, when using a multi-ports USB for battery charging, the charge current setting and charge efficiency is a trade-off. If the charge current setting is low, the charge time will be long so that the charge efficiency is low. If the charge current setting is high in order for short charge time and high charge efficiency, the power supply will be easily overloading when other device also uses other port of the USB at the same time.

Therefore, it is desired an automatic switch method and apparatus for a USB.

SUMMARY OF THE INVENTION

An object of the present invention is to provide an automatic switch method and apparatus for a USB to identify the type of the USB.

Another object of the present invention is to provide an automatic switch method and apparatus for a USB to dynamically set the output current of the USB under monitoring the voltage on the USB.

In an automatic switch method and apparatus, according to the present invention, a voltage monitor circuit monitors a voltage on the USB to determine a voltage state signal, and a current control circuit controls an output current of the USB based on the voltage state signal. Preferably, the current control circuit includes a current switch connected between the USB and system, and a current setting controller for controlling the current switch to set the output current for the USB based on the voltage state signal.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
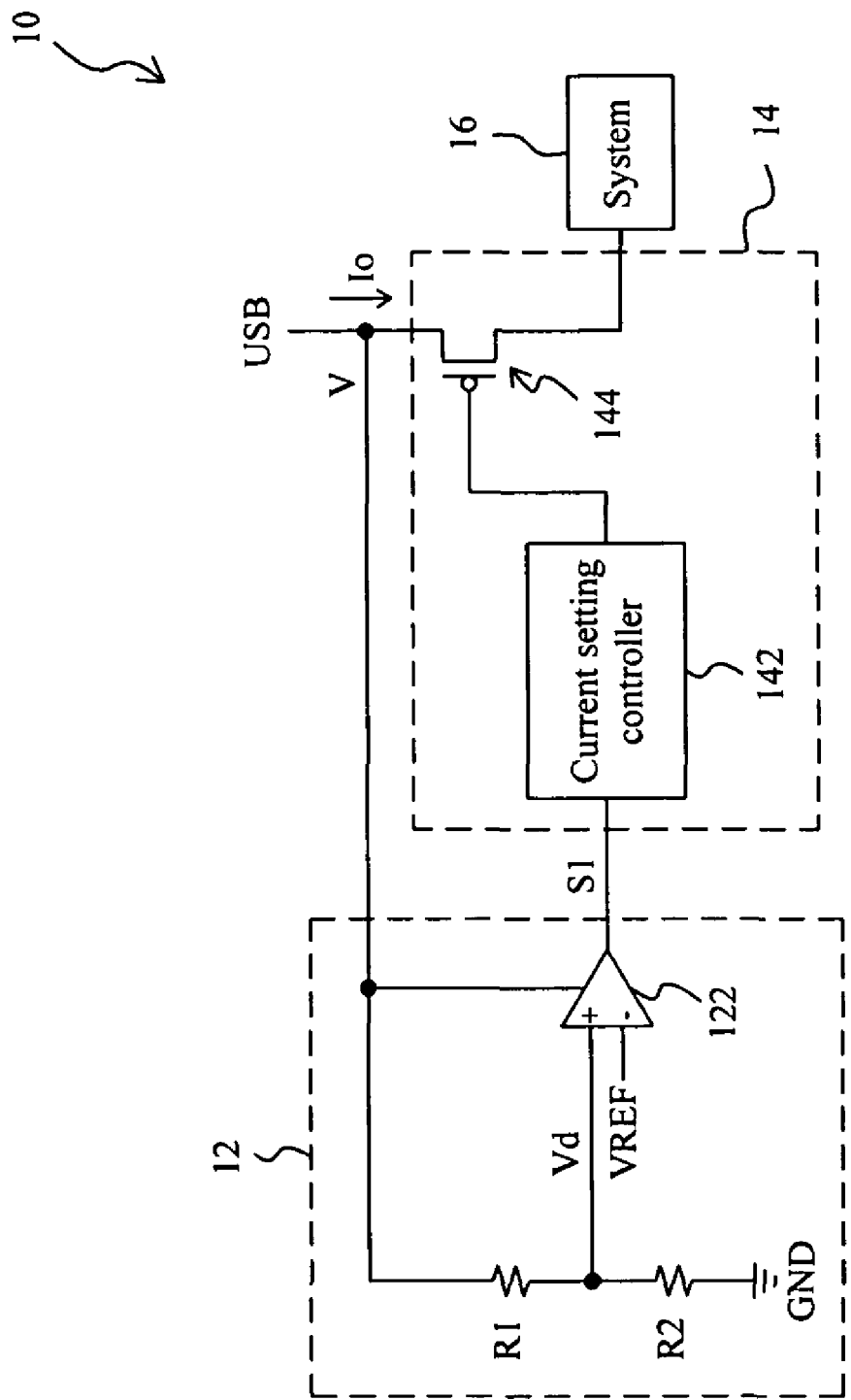
FIG. 1 shows an automatic switch apparatus for a USB according to the present invention.

FIG. 1 shows an automatic switch apparatus 10 for a USB according to the present invention, in which a voltage monitor circuit 12 monitors the voltage V on the USB for generating a voltage state signal S1, and a current control circuit 14 is connected between the USB and a system 16 to control the output current Io of the USB based on the voltage state signal S1. In the voltage monitor circuit 12, two resistances R1 and R2 are connected between the USB voltage V and ground GND to serve as a voltage divider for dividing the USB voltage V to produce a detected voltage Vd, and a comparator 122 compares the detected voltage Vd with a reference voltage VREF to determine the voltage state signal S1. In the current control circuit 14, a PMOS transistor 144 is used as a current switch connected between the USB and system 16, and a current setting controller 142 controls the PMOS transistor 144 based on the voltage state signal S1 to set the USB current Io flowing therethrough.

Figure 2:
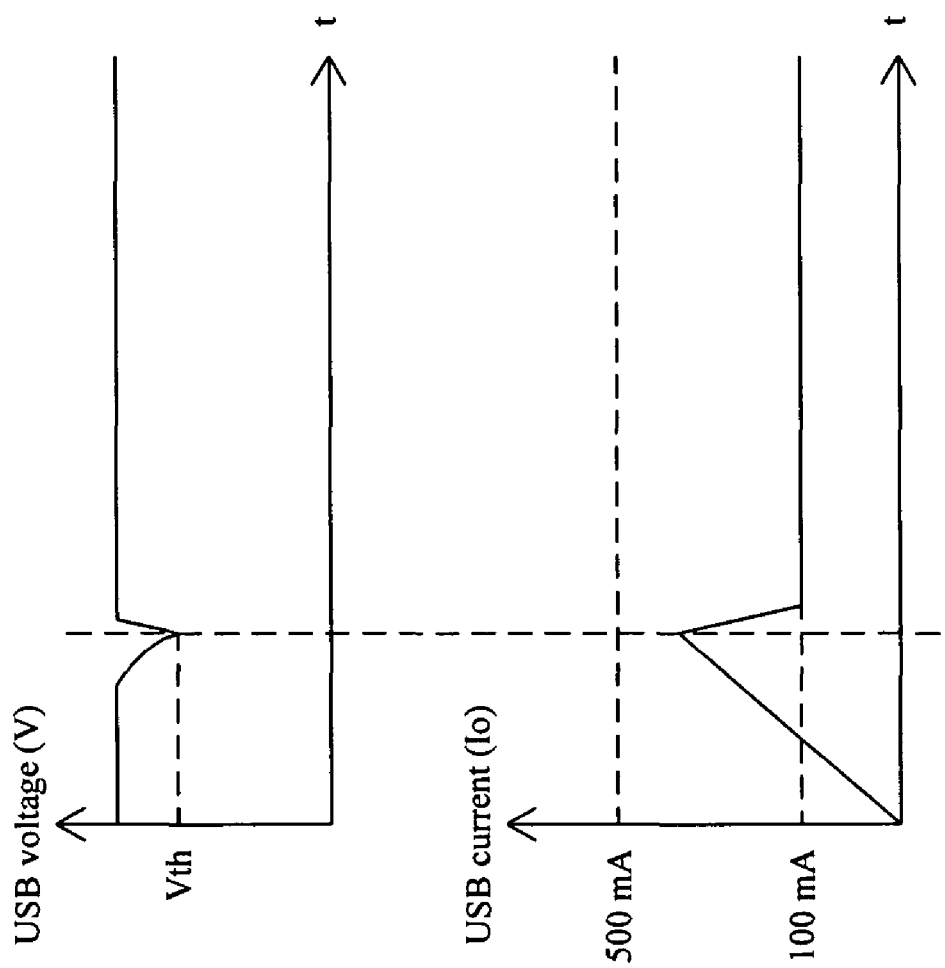
FIG. 2 shows variations of the USB voltage and USB current when the USB shown in FIG. 1 is a lower current type.
Figure 3:
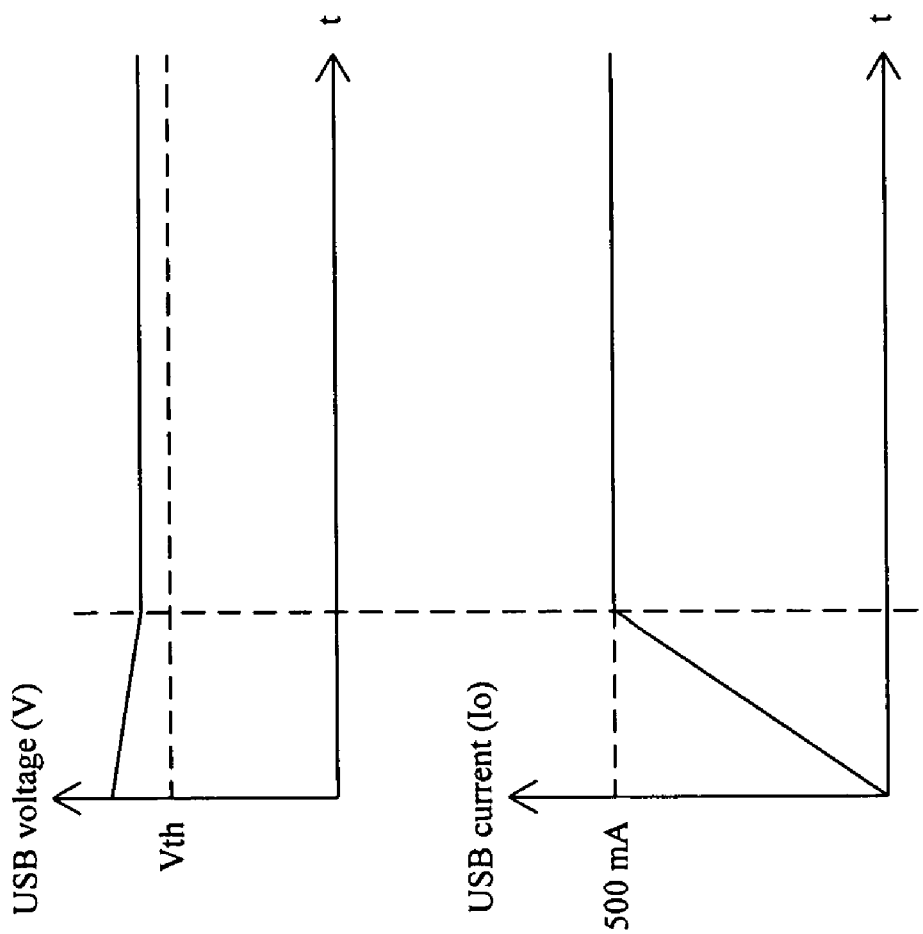
FIG. 3 shows variations of the USB voltage and USB current when the USB shown in FIG. 1 is a higher current type.

When the system 16 is connected to the USB through the automatic switch apparatus 10 at beginning, the current setting controller 142 controls the PMOS transistor 144 for the output current Io to slowly increase, and during this time period, the voltage monitor circuit 12 monitors the voltage V on the USB. As the output current Io increases, the USB voltage V may gradually decrease. As shown in FIG. 2, if the USB voltage V decreases to reach a threshold voltage Vth, i.e., the detected voltage Vd reaches the reference voltage VREF, before the output current Io reaches a threshold current, for example 500 mA, it is indicated that the USB is a lower current type, for example a 100 mA type. Therefore, the automatic switch apparatus 10 will set the output current Io at a lower level, for example 100 mA. On the contrary, as shown in FIG. 3, if the USB voltage V is always higher than the threshold voltage Vth until the output current Io reaches 500 mA, it is indicated that the USB is a 500 mA type or higher current type. Therefore, the automatic switch apparatus 10 will set the output current Io at a higher level, for example 500 mA. In other words, the automatic switch apparatus 10 may automatically set a suitable level for the output current Io of the USB depending on the identified type of the USB.

Figure 4:
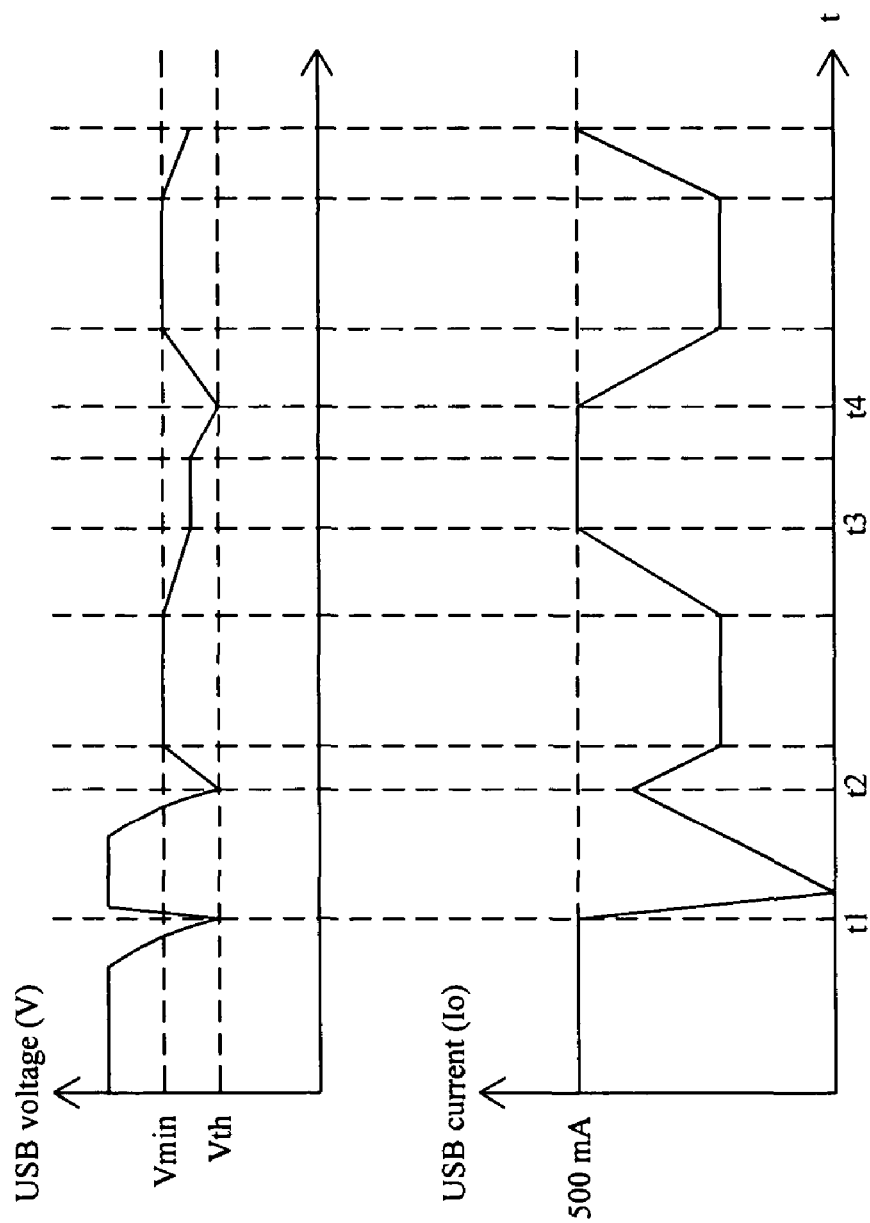
FIG. 4 shows variations of the USB voltage and USB current of the circuit shown in FIG. 1 during its operation.
Figure 5:
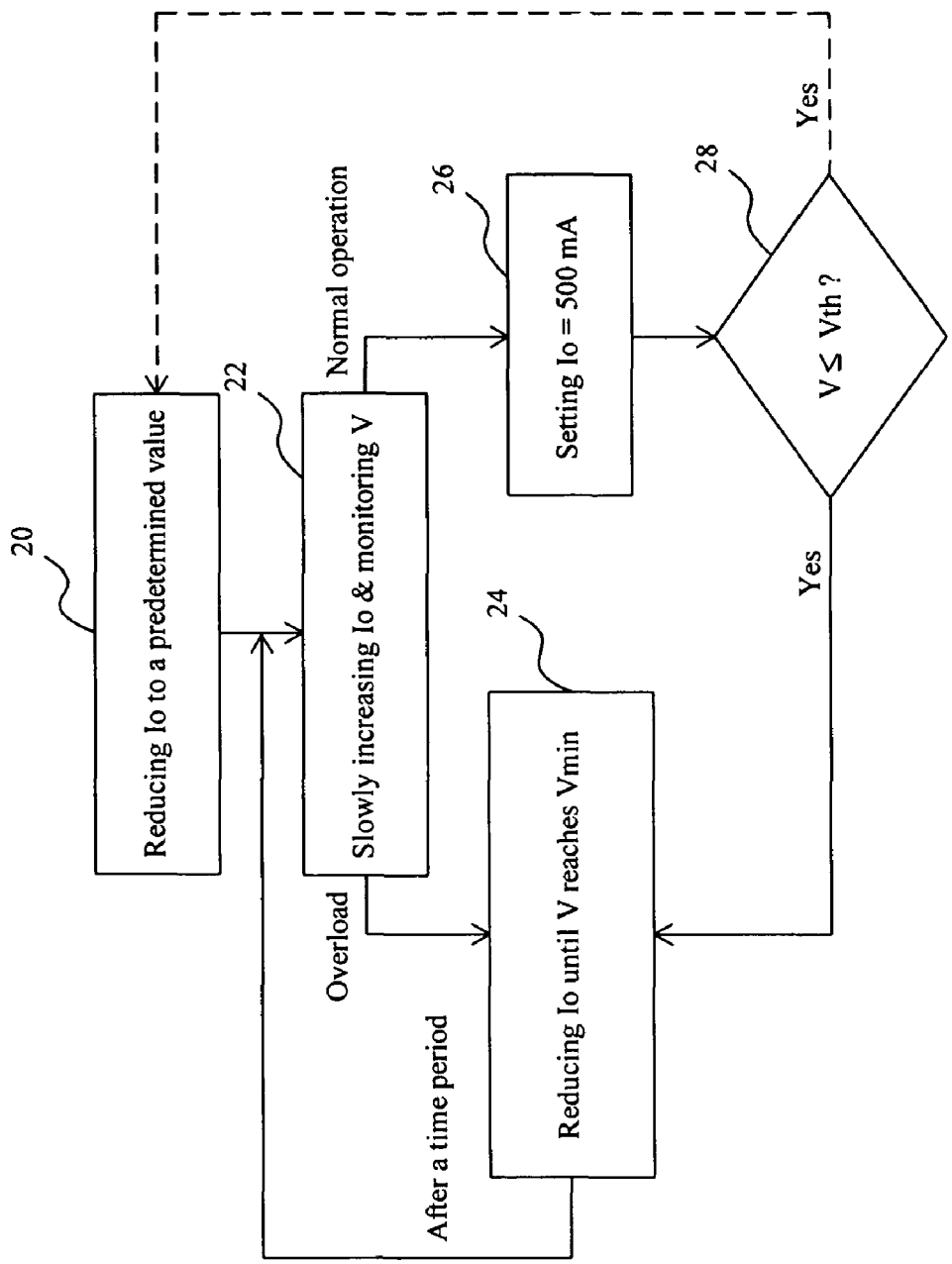
FIG. 5 shows a flowchart of setting the USB current according to the present invention.

During the USB operates, the automatic switch apparatus 10 continuously detects the voltage V on the USB. Referring to FIGS. 4 and 5, once the USB voltage V decreases to or lower than the threshold voltage Vth for some reasons, for example in the circumstances that the USB is a multi-ports USB and there is one or more devices are connected to other port or ports of the USB to drain so much current therefrom to cause the USB voltage V to drop down, as indicated at time t1 of FIG. 4, the automatic switch apparatus 10 will reduce the output current Io to a predetermined value, for example 0 mA, as indicated by step 20 of FIG. 5. Then, in step 22, the automatic switch apparatus 10 slowly increases the output current Io under monitoring the USB voltage V. If the USB voltage V decreases to reach the threshold voltage Vth, as indicated at time t2 in FIG. 4, before the output current Io reaches 500 mA, it goes to step 24 to reduce the output current Io until the USB voltage V increases to reach the minimum voltage Vmin for normal operation, as shown in FIG. 4. After a time period, the step 22 repeats. If the USB voltage V is never down to the threshold voltage Vth until the output current Io reaches 500 mA in the step 22, for example at time t3 in FIG. 4, it goes to step 26 to set the output current Io at 500 mA and then continuously monitors the USB voltage V in step 28. Once the USB voltage V is down to the threshold voltage Vth again, for example at time t4 in FIG. 4, it goes to the step 24 or step 20. If the USB voltage V remains higher than the threshold voltage Vth in the step 28, the setting for the output current Io will not change, i.e., always at 500 mA.

The automatic switch apparatus 10 can not only automatically identify the type of the USB and sets a suitable level for the USB current Io accordingly, but also dynamically set another suitable level for the USB current Io according to the variations of the USB voltage V in the operation of the USB. Therefore, the USB will never breakdown resulted from overload and high efficiency operation may be maintained simultaneously.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. An automatic switch method for a USB, comprising the steps of:

gradually increasing an output current of said USB under monitoring a voltage on said USB;

setting said output current at a first current if said output current increases to reach a first current threshold value without causing decrease of said voltage down to a second voltage threshold value; and interrupting the output current increase to set said output current at a second current if said voltage decreases to or beyond said second voltage threshold value before said output current reaches said first current threshold value.

2. An automatic switch apparatus for a USB, comprising:

a voltage monitor circuit for monitoring a voltage on said USB to thereby determine a voltage state signal; and a current control circuit connected between said USB and a system for controlling an output current of said USB based on said voltage state signal, said current control circuit alternatively controlling said output current responsive to said voltage state signal: to gradually increase said output current beyond a lower current value to reach a higher current value, or to interrupt the gradual increase to set said output current at the lower current value; wherein said interrupt occurs as the voltage on the USB gradually decreases as the output current increases.

3. The apparatus of claim 2, wherein said voltage monitor circuit comprises a comparator for comparing said voltage with a reference voltage to generate said voltage state signal.

4. The apparatus of claim 2, wherein said current control circuit comprises:

a current switch connected between said USB and system; and a current setting controller for controlling said current switch based on said voltage state signal to determine said output current.

* * * * *